United States Patent
Krauss et al.

(10) Patent No.: US 8,291,379 B2
(45) Date of Patent: Oct. 16, 2012

(54) RUNTIME ANALYSIS OF A COMPUTER PROGRAM TO IDENTIFY IMPROPER MEMORY ACCESSES THAT CAUSE FURTHER PROBLEMS

(75) Inventors: Kirk J. Krauss, Los Gatos, CA (US); Jonathan M. Sanders, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 11/609,938

(22) Filed: Dec. 13, 2006

(65) Prior Publication Data

US 2008/0148238 A1 Jun. 19, 2008

(51) Int. Cl.
*G06F 9/44* (2006.01)
(52) U.S. Cl. .......................... 717/121; 717/127
(58) Field of Classification Search .................. None
See application file for complete search history.

(56) References Cited

U.S. PATENT DOCUMENTS

| | | | |
|---|---|---|---|
| 4,542,456 A * | 9/1985 | Hill | 712/221 |
| 5,619,513 A * | 4/1997 | Shaffer et al. | 714/736 |
| 5,644,709 A * | 7/1997 | Austin | 714/53 |
| 5,768,494 A * | 6/1998 | Takeishi | 714/17 |
| 6,035,426 A | 3/2000 | Applegate | |
| 6,408,406 B1 * | 6/2002 | Parris | 714/41 |
| 6,505,305 B1 * | 1/2003 | Olarig | 714/5 |
| 6,643,842 B2 | 11/2003 | Angel et al. | |
| 6,823,507 B1 | 11/2004 | Srinivasan et al. | |
| 6,842,874 B1 * | 1/2005 | Voshell | 714/723 |
| 6,851,074 B2 * | 2/2005 | Miloiicic et al. | 714/20 |
| 6,971,047 B2 * | 11/2005 | Mayer et al. | 714/38 |
| 6,990,623 B2 | 1/2006 | Furukawa | |
| 7,124,348 B2 * | 10/2006 | Nicolaidis | 714/767 |
| 7,761,780 B2 * | 7/2010 | Kanai | 714/805 |
| 7,774,761 B2 * | 8/2010 | Vohra | 717/130 |
| 2003/0060951 A1 * | 3/2003 | Mayer et al. | 701/29 |
| 2003/0237035 A1 * | 12/2003 | Bowers et al. | 714/724 |
| 2004/0143719 A1 | 7/2004 | Nguyen et al. | |
| 2005/0022172 A1 | 1/2005 | Howard | |
| 2005/0086562 A1 | 4/2005 | Demsky et al. | |
| 2005/0289440 A1 * | 12/2005 | Nerl et al. | 714/763 |
| 2006/0075306 A1 | 4/2006 | Chandrasekaran | |
| 2006/0123216 A1 | 6/2006 | Krauss et al. | |
| 2007/0150872 A1 * | 6/2007 | Vohra | 717/130 |

(Continued)

OTHER PUBLICATIONS thefreedictionary.com "memory access—(computer science) definition", Oct. 19, 2004, p. 1, [online]][retireved Mar. 20, 2012]. REtrieved from <http://www.thefreedictionary.com/p/memory%20access>.*

(Continued)

*Primary Examiner* — Li B Zhen
*Assistant Examiner* — Evral Bodden
(74) *Attorney, Agent, or Firm* — Cuenot, Forsythe & Kim, LLC

(57) ABSTRACT

Runtime analysis of a computer program can be performed. An improper memory access to a memory location can be detected during runtime of the computer program. A record of the improper memory access can be stored during runtime. A subsequent error condition in the computer program can be detected during runtime. The error condition can be compared with the record corresponding to the improper memory access. Based upon the comparison, an indication that the error condition is related to the improper memory access can be provided.

15 Claims, 2 Drawing Sheets

U.S. PATENT DOCUMENTS

2008/0072007 A1* 3/2008 Zagatta .................. 711/170
2008/0120526 A1* 5/2008 Eguchi et al. .............. 714/773

OTHER PUBLICATIONS

Owens et al., "Software Error Classification Using Purify", IEEE, pp. 104-113 (1996).

Zhou et al., "AccMon: Automatically Detecting Memory-related Bugs via Program Counter-based Invariants", Proceedings of the 37th International Symposium on Microarchitecture, IEEE Computer Society (2004).

* cited by examiner

- value 0xAEAEAEAE was read
- value 0xAEAEAEAE was dereferenced

- value 0x12345678 was overwritten with value 0x00224466
- value 0x00224466 was subsequently read and dereferenced

RUNTIME ANALYSIS OF A COMPUTER PROGRAM TO IDENTIFY IMPROPER MEMORY ACCESSES THAT CAUSE FURTHER PROBLEMS

BACKGROUND OF THE INVENTION

Runtime analysis tools are commonly used in software development to evaluate the behavior of computer programs. Runtime analysis refers to the practice of understanding computer program behavior using data collected during execution of a computer program under test. Typically, program code is compiled using the runtime analysis tool. The tool instruments the computer program, referred to as the computer program under test, with additional code that can perform various monitoring tasks that work cooperatively with the runtime analysis tool itself. These monitoring tasks are able to detect various types of error conditions and "misbehaviors" of the computer program under test.

One type of misbehavior relates to improper memory accesses. An improper memory access can refer to an improper read of a memory location or an improper write to a memory location. Both sorts of activities can result in a severe error condition such as a crash or failure of the computer program under test. For example, an improper read, such as reading a value from uninitialized memory, often results in a crash. This is particularly true when the value read from memory is used as a pointer. An improper write to a memory location can result in an error condition since data needed by the program is effectively lost or overwritten with other data.

BRIEF SUMMARY OF THE INVENTION

The present invention relates to a method of runtime analysis of a computer program. The method can include detecting an improper read of a value from a memory location during runtime of the computer program and storing a record of the improper read during runtime. A subsequent error condition in the computer program during runtime can be detected. The error condition can be compared with the record corresponding to the improper read. The method further can include indicating that the error condition is related to the improper read according to the comparison.

The present invention also relates to a method of runtime analysis including detecting an improper write to a memory location during runtime of the computer program and storing a record of the improper write during runtime. The record can specify the memory location that was written. A subsequent error condition in the computer program can be detected during runtime. The error condition can be compared with the record corresponding to the improper write. The method further can include indicating that the subsequent error condition is related to the improper write according to the comparison.

The present invention also relates to a computer program product including a computer-usable medium having computer-usable program code that, when executed by an information processing system, performs the various steps and/or functions described herein.

DETAILED DESCRIPTION OF THE INVENTION

Figure 1:
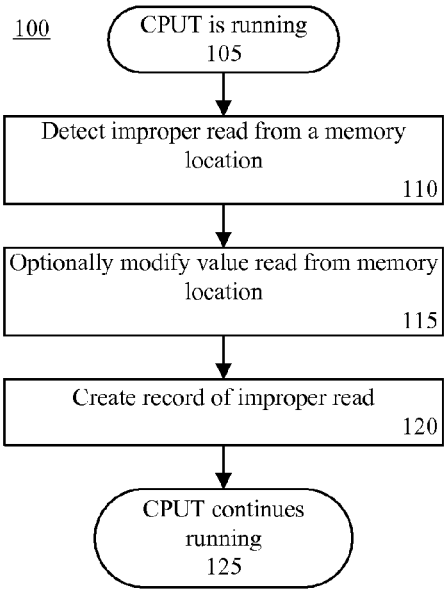
FIG. 1 is a flow chart illustrating a method in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to detecting improper memory accesses performed by a computer program and, further, determining whether subsequently detected error conditions in the computer program are related or caused by the improper memory accesses. A computer program can be instrumented with various analysis and monitoring code using a runtime analysis tool. For example, Rational® Purifyplus™ from International Business Machines Corporation of Armonk, New York, (IBM®) is an example of a runtime analysis tool capable of instrumenting code and functioning cooperatively with the computer program under test during execution. (IBM, Rational, and PurifyPlus are trademarks of International Business Machines Corporation in the United States, other countries, or both).

An instrumented computer program can be referred to as a "computer program under test" (CPUT). As the CPUT executes, i.e., at runtime, improper memory accesses can be detected and logged. As the CPUT continues to run and further error conditions are detected, those error conditions can be compared with the logged improper memory accesses. If a match is determined between an error condition and an improper memory access, a relationship can be established between the error condition and the improper memory access. The relationship can indicate that the improper memory access that was matched to the error condition is related to, or possibly the cause of, the matched error condition.

FIG. 1 is a flow chart illustrating a method 100 in accordance with one aspect of the present invention. More particularly, FIG. 1 illustrates an aspect of the present invention relating to the detection of improper reads from memory by a CPUT. In step 105, the CPUT can execute in conjunction with, or within, the runtime analysis tool. As noted, the CPUT is instrumented with monitoring and/or analysis code which aids in the detection of the various behaviors described herein. In step 1 10, the runtime analysis tool can detect an improper read from a memory location by the CPUT.

Those skilled in the art will appreciate that a runtime analysis tool, such as PurifyPlus, for example, can monitor CPUT execution and detect when the CPUT performs functions such as reading or writing beyond the bounds of an array, using uninitialized memory, reading or writing to freed memory, reading or writing beyond the stack pointer, reading or writing through null pointers, leaking memory and file descriptors, or the like. This list is not intended to be exhaustive, but rather to provide several examples of the sort of improper memory accesses that can be detected and logged using a runtime analysis tool.

As used herein, an "improper memory access" can be a read from a memory location or a write to a memory location that does not conform with an accepted standard and/or protocol for programming. The cases listed above, for example, can be considered instances of improper memory accesses. An improper memory access, though non-compliant with accepted programming practice or guidelines, may or may not cause an error condition, such as a crash, to occur within the computer program.

In step 115, the value read from memory, optionally, can be modified or varied. For example, the value in memory can be overwritten or spayed with a predetermined bit pattern or changed to a unique value. The changed value can be provided to the CPUT as the value read from memory, rather than the original value prior to being changed. Changing the value in this manner can help to stimulate error conditions in the CPUT that otherwise could go undetected or unnoticed. In addition, changing the value can ensure that each record that is created for an improper read can be uniquely identified based upon the unique value stored in memory, which becomes part of the improper read record. This can help to reduce erroneous associations between records of improper reads and error conditions as will be described herein in further detail.

In step 120, a record of the improper read can be created. The record can specify the value that was read from memory as well as the memory location from which the value was read. In one embodiment, where the value is modified, the modified value can be included within the record in addition to the original value or in lieu of the original value read from memory. In step 125, the CPUT can continue to run. The method 100 can be repeated to continue to identify further improper reads performed by the CPUT during execution.

Figure 2:
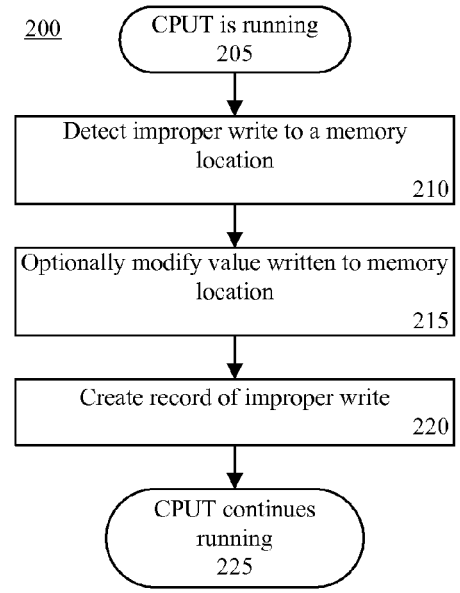
FIG. 2 is a flow chart illustrating a method in accordance with another aspect of the present invention.

FIG. 2 is a flow chart illustrating a method 200 in accordance with another aspect of the present invention. FIG. 2 illustrates an aspect of the present invention relating to the detection of improper writes by the CPUT to a location in memory. As was the case with FIG. 1, the method 200 can begin in step 205, where the CPUT is running. In step 210, the runtime analysis tool can detect an improper write to a memory location by the CPUT.

In step 215, the value written to memory, optionally, can be modified or varied. For example, the value in memory can be overwritten, or spayed, with a predetermined bit pattern or changed to a unique value. As noted, this can hasten an error condition and/or prevent incorrect associations between error conditions and records of improper writes from being created. In step 220, a record of the improper write can be created. The record can specify the value that was written as well as the memory location to which the value was written. In one embodiment, where the value is modified, the modified value can be included within the record in addition to the original value or in lieu of the original value written to memory. In step 225, the CPUT can continue to run. The method 200 can be repeated to continue to identify further improper writes performed by the CPUT during execution.

Figure 3:
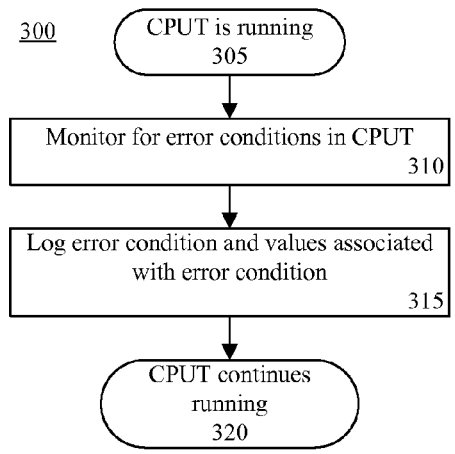
FIG. 3 is a flow chart illustrating a method in accordance with another aspect of the present invention.

FIG. 3 is a flow chart illustrating a method 300 in accordance with another aspect of the present invention. FIG. 3 illustrates an aspect of the present invention that relates to detecting error conditions that arise in the CPUT as it continues to run. The method 300 can begin in step 305 where the CPUT is executing. In step 310, the runtime analysis tool can monitor for the occurrence of error conditions. In step 315, any detected error conditions within the CPUT can be logged. A record for each of the error conditions can be created.

The record can specify different values that are associated with the error condition. In one embodiment, the record of the error condition can specify any values that are dereferenced. A pointer whose value has been set via an improper read is likely to point to an unexpected location. When such a pointer is subsequently dereferenced, an error condition may result. By preparing the value of each such pointer as a distinct value, the runtime analysis tool can associate this subsequent error condition with the original improper memory read and indicate this association to the user. If a significant number of additional improper memory reads have occurred without resulting in additional subsequent error conditions while the CPUT has been running, the user can thus be informed regarding which improper memory reads have resulted in actual error conditions.

A user who is attempting to diagnose a specific error condition using the runtime analysis tool can thereby receive the immediate benefit of having the error condition automatically tracked to its source. Such a user will not need to inspect each and every improper read detected by the runtime analysis tool in order to diagnose the source of the error condition. Some error conditions that can be diagnosed in this way can include reading or writing to unallocated memory, heap corruption caused by improperly overwriting heap memory blocks or heap control blocks, access violation exceptions, and data misalignment conditions. This list is not intended to be exhaustive, but rather to illustrate some capabilities of the present invention.

In step 320, the CPUT can continue to run. The method 300 can continue to repeat as may be required in the analysis of the CPUT.

Figures 4, 5, 6:
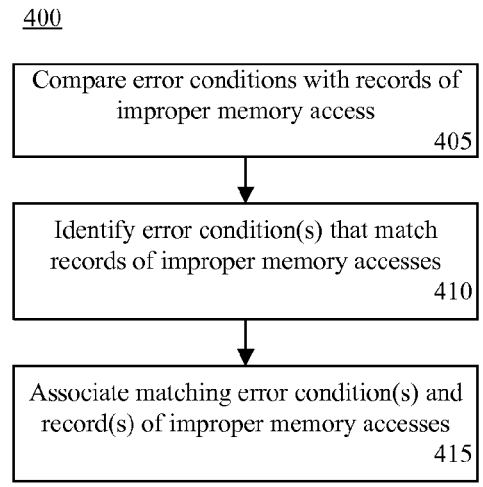
FIG. 4 is a flow chart illustrating a method in accordance with another aspect of the present invention.
FIG. 5 is a view of a graphical user interface (GUI) in accordance with another aspect of the present invention.
FIG. 6 is a view of a GUI in accordance with another aspect of the present invention.

FIG. 4 is a flow chart illustrating a method 400 in accordance with another aspect of the present invention. FIG. 4 illustrates an aspect of the present invention that relates to determining relationships among improper memory accesses and error conditions that occur within the CPUT. The method 400 illustrates a general technique which can be used in comparing records of improper memory accesses with error conditions. A process such as method 400, or similar to method 400, can be performed as the CPUT continues to execute. For example, responsive to detecting an error condition, the error condition can be compared against records of detected improper memory accesses. In another aspect, a process such as the method 400, or similar to method 400, can be performed after the CPUT completes execution, e.g., in an "offline" capacity. In that case, records generated for error conditions can be compared with the records generated for improper memory accesses.

Accordingly, in step 405, error conditions, or records of error conditions, can be compared with records of improper memory accesses. For example, the values stored within the records of improper memory accesses can be compared with dereferenced values relating to the detected error conditions. Values read from memory or written to memory, whether modified or not, as specified within the records of improper memory accesses can be compared with values determined from the error conditions.

In step 410, error condition(s) that match records of improper memory accesses can be identified. In one embodiment, a record of an improper memory access and an error condition can be said to match if a value specified in the record of the improper memory access matches a value determined from the error condition, e.g. a dereferenced value. In another embodiment, a record of an improper memory access and an error condition can be said to match if a value specified by the record of the memory access falls within a range of values associated with the error condition. The range can be constructed by taking a value determined from the error condition, e.g., a dereferenced value, and adding some predetermined offset above and/or below the value as the upper and/or lower bounds of the range. It should be appreciated that in the case of records for improper writes, a matching error condition also be one caused by, or related to, a read from the same memory location that was written during the matching improper write. That is, memory locations can be compared.

In step 415, matching improper memory access records and error conditions can be associated with one another. An association between an improper memory access and an error condition can indicate that the improper memory access is related to the matching error condition. For example, the improper memory access can be said to be the cause of the matching error condition.

FIG. 5 is a view 500 of a graphical user interface (GUI) in accordance with another aspect of the present invention. View 500 illustrates a portion of the output that can be generated by a runtime analysis tool which performs the analysis disclosed herein. The view 500 illustrates a Purify-style "ABR" or "Reading Beyond Array Boundaries" error. The ABR error report illustrated in view 500 indicates that the value "0xAEAEAEAE" from a record of an improper read has been matched with an error condition in which that value, or one close to it, was dereferenced. Purify automatically sprays the memory adjacent to each allocated block with this "0xAEAEAEAE" pattern.

In some cases, multiple error conditions, e.g., ABRs, that involve the value "0xAEAEAEAE" may be linked improperly with records of improper memory accesses that also specify the same value. That is, the error conditions, though specifying the same value as the error condition, may not actually be related. Accordingly, the embodiments in which the value that is read or written in an improper memory access is changed can avoid matching records for improper memory accesses with unrelated error conditions as the changed value can be unique to the improper memory access. Each ABR, for example, can be associated with a unique value or range of values.

FIG. 6 is a view 600 of a GUI in accordance with another aspect of the present invention. View 600 illustrates a portion of the output that also can be generated by a runtime analysis tool that performs the analysis disclosed herein. The view 600 illustrates an "ABW" or "Writing Beyond Array Boundaries" error. The ABW error report illustrated in view 600 indicates that the value "0x12345678" was overwritten with the value "0x00224466" in an improper read, and that the value "0x00224466" was subsequently dereferenced during a detected error condition.

The embodiments disclosed herein can be used to indicate those instances of improper memory accesses that are believed to cause other program failures or fault conditions. In one aspect, the output of the runtime analysis tool can be filtered to present only those improper memory accesses that have been matched to error conditions. In another aspect, the full output can be provided, but improper memory accesses that have been matched to error conditions can be flagged or otherwise indicated within the output.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of runtime analysis of a computer program comprising:
   detecting an improper read of a value from a memory location during runtime of the computer program;
   storing a record of the improper read during runtime;
   detecting a subsequent error condition in the computer program during runtime;
   comparing the error condition with the record corresponding to the improper read; and
   indicating that the error condition is related to the improper read according to the comparison;
   altering the value stored at the memory location; and storing the altered value within the record of the improper read; wherein the comparing determines whether the altered value of the record of the improper read is within a range of values determined from the error condition.

2. The method of claim 1, wherein
   the stored record includes a value read from the memory location by the improper read.

3. The method of claim 2, wherein
   the comparing determines whether the value read from the memory location matches a value associated with the error condition.

4. The method of claim 2, wherein
   the comparing determines whether the value read from the memory location is within a range of values determined from the error condition.

5. The method of claim 1, wherein the comparing determines whether the altered value of the record of the improper read matches a value determined from the error condition.

6. A method of runtime analysis of a computer program comprising:
   detecting an improper write to a memory location during runtime of the computer program;
   storing a record of the improper write during runtime, wherein the record specifies the memory location;
   detecting a subsequent error condition in the computer program during runtime;
   comparing the error condition with the record corresponding to the improper write; and
   indicating that the subsequent error is related to the improper write according to the comparison;
   altering the value written to the memory location; and storing the altered value within the record of the improper write; wherein the comparing determines whether the altered value of the record of the improper write is within a range of values determined from the error condition.

7. The method of claim 6, wherein
the detecting identifies an error associated with reading from the memory location.

8. The method of claim 6, wherein
the stored record includes a value written to the memory location by the improper write.

9. The method of claim 8, wherein
the comparing determines whether the value written to the memory location or the memory location matches a value associated with the error condition.

10. The method of claim 6, wherein the comparing determines whether the altered value of the record of the improper write matches a value determined from the error condition.

11. A computer program product comprising a computer-usable storage medium having stored therein computer-usable program code that performs runtime analysis of a computer program, said computer-usable program code, which when executed by a computer hardware system, causes the computer hardware system to perform:
   detecting an improper memory access to a memory location during runtime of the computer program;
   storing a record of the improper memory access during runtime;
   detecting a subsequent error condition in the computer program during runtime;
   comparing the error condition with the record corresponding to the improper memory access; and
   indicating that the error condition is related to the improper memory access according to the comparison;
   altering a value stored at the memory location by the improper memory access;
   and storing the altered value within the record of the improper memory access;
   wherein the comparing determines whether the value written to the memory location or the memory location is within a range of values determined from the error condition; and wherein the computer-usable storage medium does not include a transitory, propagating signal.

12. The computer program product of claim 11, wherein
the memory access is a read access, and
the stored record includes a value read from the memory location by the improper read access.

13. The computer program product of claim 12, wherein
the comparing determines whether the value read from the memory location matches at least one value determined from the error condition.

14. The computer program product of claim 11, wherein
the memory access is a write access, and
the stored record includes at least one of the memory location and a value that is written to the memory location.

15. The computer program product of claim 14, wherein
the comparing determines whether the value written to the memory location or the memory location matches at least one value determined from the error condition.

* * * * *